United States Patent
Liao et al.

(10) Patent No.: US 12,350,907 B2
(45) Date of Patent: Jul. 8, 2025

(54) IMPACT-RESISTANT POLYPROPYLENE FILM AND METHOD FOR PRODUCING THE SAME

(71) Applicant: NAN YA PLASTICS CORPORATION, Taipei (TW)

(72) Inventors: Te-Chao Liao, Taipei (TW); Ching-Yao Yuan, Taipei (TW); Chih-Feng Wang, Taipei (TW)

(73) Assignee: NAN YA PLASTICS CORPORATION, Taipei (TW)

( * ) Notice: Subject to any disclaimer, the term of this patent is extended or adjusted under 35 U.S.C. 154(b) by 323 days.

(21) Appl. No.: 18/148,399

(22) Filed: Dec. 29, 2022

(65) Prior Publication Data

US 2024/0131827 A1 Apr. 25, 2024
US 2024/0227369 A9 Jul. 11, 2024

(30) Foreign Application Priority Data

Oct. 24, 2022 (TW) ................................. 111140182

(51) Int. Cl.
*B32B 27/08* (2006.01)
*B29C 48/08* (2019.01)
*B32B 27/32* (2006.01)

(52) U.S. Cl.
CPC .............. *B32B 27/08* (2013.01); *B32B 27/32* (2013.01); *B29C 48/08* (2019.02); *B32B 2250/242* (2013.01); *B32B 2250/40* (2013.01); *B32B 2270/00* (2013.01); *B32B 2307/30* (2013.01);

(Continued)

(58) Field of Classification Search
CPC ... B32B 27/32–27/327; B32B 2250/03; B32B 2250/242; B32B 2250/40; C08L 23/00–23/36
See application file for complete search history.

(56) References Cited

U.S. PATENT DOCUMENTS

| 2021/0283889 | A1* | 9/2021 | Tomatsu | .................... B32B 1/00 |
| 2023/0135527 | A1* | 5/2023 | Tomatsu | ................. C08L 23/16 |
| | | | | 428/516 |
| 2023/0202153 | A1* | 6/2023 | Hamada | ................. C08L 23/10 |
| | | | | 428/35.7 |

FOREIGN PATENT DOCUMENTS

| TW | 202208182 A | 3/2022 | |
| WO | WO-2020022060 A1 * | 1/2020 | ............... B32B 1/00 |

(Continued)

*Primary Examiner* — Prashant J Khatri
(74) *Attorney, Agent, or Firm* — Li & Cai Intellectual Property Office

(57) ABSTRACT

An impact-resistant polypropylene film and a method for producing the same are provided. The impact-resistant polypropylene film includes two outer layers and a middle layer. Each of the outer layers includes a propylene block polymer. The propylene block polymer includes a propylene monomer and an ethylene-propylene polymer, and the ethylene-propylene polymer is dispersed in the propylene monomer to form a sea-island structure. The sea-island structure includes a sea phase and an island phase, the propylene monomer is defined as the sea phase, and the ethylene-propylene polymer is defined as the island phase. The middle layer includes a propylene block polymer and an ethylene elastomer. Based on 100 parts by weight of the middle layer, a content of the propylene block polymer is 60 to 80 parts by weight, and a content of the ethylene elastomer is 20 to 40 parts by weight.

15 Claims, 1 Drawing Sheet

(52) U.S. Cl.
CPC ..... *B32B 2307/31* (2013.01); *B32B 2307/558* (2013.01)

(56) References Cited

FOREIGN PATENT DOCUMENTS

| WO | WO-2021200592 A1 * | 10/2021 | ............. B32B 27/08 |
| WO | WO-2021251195 A1 * | 12/2021 | ............. B32B 27/08 |

\* cited by examiner

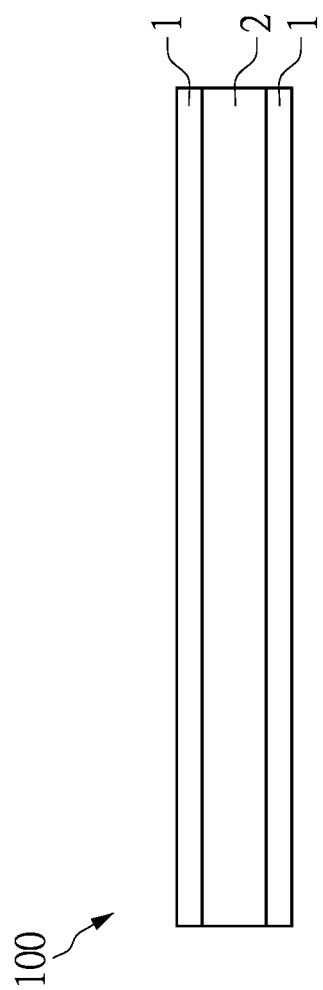

IMPACT-RESISTANT POLYPROPYLENE FILM AND METHOD FOR PRODUCING THE SAME

CROSS-REFERENCE TO RELATED PATENT APPLICATION

This application claims the benefit of priority to Taiwan Patent Application No. 111140182, filed on Oct. 24, 2022. The entire content of the above identified application is incorporated herein by reference.

Some references, which may include patents, patent applications and various publications, may be cited and discussed in the description of this disclosure. The citation and/or discussion of such references is provided merely to clarify the description of the present disclosure and is not an admission that any such reference is "prior art" to the disclosure described herein. All references cited and discussed in this specification are incorporated herein by reference in their entireties and to the same extent as if each reference was individually incorporated by reference.

FIELD OF THE DISCLOSURE

The present disclosure relates to a polypropylene film and a method for producing the same, and more particularly to an impact-resistant polypropylene film and a method for producing the same.

BACKGROUND OF THE DISCLOSURE

A conventional polypropylene film is usually applicable to a food packaging bag (e.g., a cooking bag). However, the conventional polypropylene film generally does not have a sufficient impact resistance. As a result, it is common for the conventional polypropylene film to be used in cooperation with a nylon film, such that the food packaging bag can have a sufficient impact resistance.

In other words, since the conventional polypropylene film itself cannot provide a sufficient impact resistance, the material and the structure of the food packaging bag cannot be simplified.

SUMMARY OF THE DISCLOSURE

In response to the above-referenced technical inadequacy, the present disclosure provides an impact-resistant polypropylene film and a method for producing the same, so as to effectively improve an issue of a conventional polypropylene film not having a sufficient impact resistance.

In one aspect, the present disclosure provides an impact-resistant polypropylene film. The impact-resistant polypropylene film has a three-layered structure, and the impact-resistant polypropylene film includes two outer layers and a middle layer. Each of the two outer layers includes a propylene block polymer. The propylene block polymer includes a propylene monomer and an ethylene-propylene polymer, and the ethylene-propylene polymer is dispersed in the propylene monomer to form a sea-island structure. The sea-island structure includes a sea phase and an island phase, the propylene monomer is defined as the sea phase, and the ethylene-propylene polymer is defined as the island phase. The middle layer is arranged between the two outer layers and includes a propylene block polymer and an ethylene elastomer. Based on 100 parts by weight of the middle layer, a content of the propylene block polymer is 60 to 80 parts by weight, and a content of the ethylene elastomer is 20 to 40 parts by weight. After the impact-resistant polypropylene film is placed in an environment having a temperature of 135° C. for 30 minutes, an impact resistance of the impact-resistant polypropylene film is within a range from 80 J/cm to 120 J/cm.

In certain embodiments, in each of the outer layers, a melt index (MI) of the propylene block polymer is within a range from 0.5 to 5.

In certain embodiments, in each of the outer layers, based on 100 parts by weight of the propylene block polymer, a content of the propylene monomer is 78 to 83 parts by weight, and a content of the ethylene-propylene polymer is 17 to 22 parts by weight.

In certain embodiments, in the middle layer, a melt index (MI) of the propylene block polymer is within a range from 0.5 to 5, and a melt index (MI) of the ethylene elastomer is within a range from 0.5 to 5.

In certain embodiments, the ethylene elastomer is at least one selected from the group consisting of an ethylene propylene elastomer and an ethylene octene elastomer.

In certain embodiments, in the middle layer, the propylene block polymer includes a propylene monomer and an ethylene-propylene polymer, and the ethylene-propylene polymer is dispersed in the propylene monomer to form a sea-island structure. The sea-island structure includes a sea phase and an island phase, the propylene monomer is defined as the sea phase, and the ethylene-propylene polymer is defined as the island phase.

In certain embodiments, in the middle layer, based on 100 parts by weight of the propylene block polymer, a content of the propylene monomer is 78 to 83 parts by weight, and a content of the ethylene-propylene polymer is 17 to 22 parts by weight.

In certain embodiments, a thickness of each of the outer layers is 20% to 40% of a thickness of the impact-resistant polypropylene film, and a thickness of the middle layer is 60% to 80% of the thickness of the impact-resistant polypropylene film.

In certain embodiments, a heat seal strength of the impact-resistant polypropylene film is within a range from 55 N/15 mm to 79 N/15 mm.

In certain embodiments, each of the outer layers does not include other components except the propylene block polymer.

In another aspect, the present disclosure provides a method for producing an impact-resistant polypropylene film. The method includes a preparation step and a co-extruding step. The preparation step is implemented by preparing a propylene block polymer and an ethylene elastomer, the propylene block polymer includes a propylene monomer and an ethylene-propylene polymer, and the ethylene-propylene polymer is dispersed in the propylene monomer to form a sea-island structure. The sea-island structure includes a sea phase and an island phase, the propylene monomer is defined as the sea phase, and the ethylene-propylene polymer is defined as the island phase. The co-extruding step is implemented by co-extruding the propylene block polymer and the ethylene elastomer to form the impact-resistant polypropylene film, the impact-resistant polypropylene has a three-layered structure, and the impact-resistant polypropylene film includes two outer layers and a middle layer arranged between the two outer layers. Each of the outer layers includes the propylene block polymer, and the middle layer includes the propylene block polymer and the ethylene elastomer. Based on 100 parts by weight of the middle layer, a content of the propylene block polymer is 60 to 80 parts by weight, and a content of the ethylene elastomer is 20 to 40 parts by weight. After the impact-resistant polypropylene film is placed in an environment having a temperature of 135° C. for 30 minutes, an impact resistance of the impact-resistant polypropylene film is within a range from 80 J/cm to 120 J/cm.

In certain embodiments, in each of the outer layers, a melt index (MI) of the propylene block polymer is within a range from 0.5 to 5. In the middle layer, a melt index (MI) of the propylene block polymer is within a range from 0.5 to 5, and a melt index (MI) of the ethylene elastomer is within a range from 0.5 to 5.

In certain embodiments, in each of the outer layers, based on 100 parts by weight of the propylene block polymer, a content of the propylene monomer is 78 to 83 parts by weight, and a content of the ethylene-propylene polymer is 17 to 22 parts by weight.

In certain embodiments, the ethylene elastomer is at least one selected from the group consisting of an ethylene propylene elastomer and an ethylene octene elastomer.

In certain embodiments, in the middle layer, the propylene block polymer includes a propylene monomer and an ethylene-propylene polymer, and the ethylene-propylene polymer is dispersed in the propylene monomer to form a sea-island structure. The sea-island structure includes a sea phase and an island phase, the propylene monomer is defined as the sea phase, and the ethylene-propylene polymer is defined as the island phase. In the middle layer, based on 100 parts by weight of the propylene block polymer, a content of the propylene monomer is 78 to 83 parts by weight, and a content of the ethylene-propylene polymer is 17 to 22 parts by weight.

Therefore, in the impact-resistant polypropylene film and the method for producing the same provided by the present disclosure, by virtue of "each of the two outer layers including a propylene block polymer, the propylene block polymer including a propylene monomer and an ethylene-propylene polymer, and the ethylene-propylene polymer being dispersed in the propylene monomer to form a sea-island structure," "the middle layer including a propylene block polymer and an ethylene elastomer," and "based on 100 parts by weight of the middle layer, a content of the propylene block polymer being 60 to 80 parts by weight, and a content of the ethylene elastomer being 20 to 40 parts by weight," the issue of the conventional polypropylene film not having a sufficient impact resistance can be effectively improved.

These and other aspects of the present disclosure will become apparent from the following description of the embodiment taken in conjunction with the following drawings and their captions, although variations and modifications therein may be affected without departing from the spirit and scope of the novel concepts of the disclosure.

BRIEF DESCRIPTION OF THE DRAWING

The described embodiments may be better understood by reference to the following description and the accompanying drawing, in which:

FIG. 1 is a schematic view of an impact-resistant polypropylene film according to an embodiment of the present disclosure.

DETAILED DESCRIPTION OF THE EXEMPLARY EMBODIMENTS

The present disclosure is more particularly described in the following examples that are intended as illustrative only since numerous modifications and variations therein will be apparent to those skilled in the art. Like numbers in the drawings indicate like components throughout the views. As used in the description herein and throughout the claims that follow, unless the context clearly dictates otherwise, the meaning of "a", "an", and "the" includes plural reference, and the meaning of "in" includes "in" and "on". Titles or subtitles can be used herein for the convenience of a reader, which shall have no influence on the scope of the present disclosure.

The terms used herein generally have their ordinary meanings in the art. In the case of conflict, the present document, including any definitions given herein, will prevail. The same thing can be expressed in more than one way. Alternative language and synonyms can be used for any term(s) discussed herein, and no special significance is to be placed upon whether a term is elaborated or discussed herein. A recital of one or more synonyms does not exclude the use of other synonyms. The use of examples anywhere in this specification including examples of any terms is illustrative only, and in no way limits the scope and meaning of the present disclosure or of any exemplified term. Likewise, the present disclosure is not limited to various embodiments given herein. Numbering terms such as "first", "second" or "third" can be used to describe various components, signals or the like, which are for distinguishing one component/signal from another one only, and are not intended to, nor should be construed to impose any substantive limitations on the components, signals or the like.

Impact-Resistant Polypropylene Film

Referring to FIG. 1, FIG. 1 is a schematic view of an impact-resistant polypropylene film according to an embodiment of the present disclosure. An embodiment of the present disclosure provides an impact-resistant polypropylene film 100. The impact-resistant polypropylene film 100 is applicable for food packaging. For example, the impact-resistant polypropylene film 100 is applicable as a film used in a cooking bag, and the impact-resistant polypropylene film 100 can provide an excellent impact resistance without being used with a nylon film.

In addition, the impact-resistant polypropylene film 100 can provide an excellent impact resistance after being sterilized at a high temperature. For example, after the impact-resistant polypropylene film 100 is placed in an environment having a temperature of 135° C. for 30 minutes, an impact resistance of the impact-resistant polypropylene film 100 is within a range from 80 J/cm to 120 J/cm.

The impact-resistant polypropylene film 100 can be co-extruded to form a three-layered structure. The impact-resistant polypropylene film 100 includes two outer layers 1 and a middle layer 2, and the middle layer 2 is arranged between the two outer layers 1. In addition, the impact-resistant polypropylene film 100 can be integrally formed, and there can be no solvent or adhesive between the middle layer 2 and any one of the outer layers 1.

In the present embodiment, a thickness of the impact-resistant polypropylene film 100 is within a range from 60 micrometers to 100 micrometers, a thickness of each of the outer layers 1 is within a range from 12 micrometers to 40 micrometers, and a thickness of the middle layer 2 is within a range from 40 micrometers to 80 micrometers. Or, the thickness of each of the outer layers 1 is 20% to 40% of the thickness of the impact-resistant polypropylene film 100, and the thickness of the middle layer 2 is 60% to 80% of the thickness of the impact-resistant polypropylene film 100. In addition, a heat seal strength of the impact-resistant polypropylene film 100 is within a range from 55 N/15 mm to 79 N/15 mm.

Each of the outer layers 1 includes a propylene block polymer. In each of the outer layers 1, the propylene block polymer includes a propylene monomer and an ethylene-propylene polymer, and the ethylene-propylene polymer is dispersed in the propylene monomer to form a sea-island structure. The sea-island structure includes a sea phase and an island phase, the propylene monomer is defined as the sea phase, and the ethylene-propylene polymer is defined as the island phase.

In each of the outer layers 1, a melt index (MI) of the propylene block polymer is within a range from 0.5 to 5. Preferably, the melt index (MI) of the propylene block polymer is within a range from 1.5 to 4. More preferably, the melt index (MI) of the propylene block polymer is within a range from 2 to 3.5.

In addition, in each of the outer layers 1, based on 100 parts by weight of the propylene block polymer, a content of the propylene monomer is 78 to 83 parts by weight, and a content of the ethylene-propylene polymer is 17 to 22 parts by weight. Preferably, the content of the propylene monomer is 82 parts by weight, and the content of the ethylene-propylene polymer is 18 parts by weight. It is worth mentioning that, the propylene block polymer of each of the outer layers 1 is mainly configured to provide the impact-resistant polypropylene film 100 with a heat resistance and the heat seal strength. Hence, if the content of the ethylene-propylene polymer in the propylene block polymer of each of the outer layers 1 is too low, the impact-resistant polypropylene film 100 may not have a sufficient heat resistance and a sufficient heat seal strength. In addition, each of the outer layers 1 can be without other components except the propylene block polymer, but the present disclosure is not limited thereto.

In the ethylene-propylene polymer of the propylene block polymer of each of the outer layers 1, a content ratio between ethylene and propylene is 10 to 45:55 to 90, and preferably 30:70. An intrinsic viscosity of the ethylene-propylene polymer is within a range from 1 dl/g to 5 dl/g, and preferably 3 dl/g. An aggregation method for forming the sea-island structure in the propylene block polymer is described as follows. First, aggregation is performed by using the propylene alone, and then the ethylene and the propylene are aggregated in batches. The sea-island structure is generated since an ethylene-propylene copolymer aggregated later and a polymer aggregated by pure propylene have an incompatible interface generated there-between.

The middle layer 2 includes a propylene block polymer and an ethylene elastomer. Based on 100 parts by weight of the middle layer 2, a content of the propylene block polymer is 60 to 80 parts by weight, and a content of the ethylene elastomer is 20 to 40 parts by weight.

In the middle layer 2, a melt index (MI) of the propylene block polymer is within a range from 0.5 to 5, and a melt index (MI) of the ethylene elastomer is within a range from 0.5 to 5. Preferably, in the middle layer 2, the melt index (MI) of the propylene block polymer is within a range from 1.5 to 4, and the melt index (MI) of the ethylene elastomer is within a range from 1.5 to 4. More preferably, the melt index (MI) of the propylene block polymer is within a range from 2 to 3.5, and the melt index (MI) of the ethylene elastomer is within a range from 2 to 3.5.

In the middle layer 2, the propylene block polymer includes a propylene monomer and an ethylene-propylene polymer, and the ethylene-propylene polymer is dispersed in the propylene monomer to form a sea-island structure. The sea-island structure includes a sea phase and an island phase, the propylene monomer is defined as the sea phase, and the ethylene-propylene polymer is defined as the island phase. It is worth mentioning that, the propylene block polymer of the middle layer 2 can be the same as or different from the propylene block polymer of each of the outer layers 1, and the present disclosure is not limited thereto.

In the middle layer 2, based on 100 parts by weight of the propylene block polymer, a content of the propylene monomer is 78 to 83 parts by weight, and a content of the ethylene-propylene polymer is 17 to 22 parts by weight.

It is worth mentioning that, the ethylene elastomer in the middle layer 2 is mainly configured to provide softness and the impact resistance. If the middle layer 2 only includes the propylene block polymer and does not include the ethylene elastomer, the impact-resistant polypropylene film 100 may crack when being dropped to the ground or receiving an impact.

In addition, the ethylene elastomer is at least one selected from the group consisting of an ethylene propylene elastomer and an ethylene octene elastomer. It is worth mentioning that, if the ethylene elastomer is selected from materials (e.g., an ethylene butylene elastomer) other than the ethylene propylene elastomer and the ethylene octene elastomer, the impact-resistant polypropylene film 100 cannot have a sufficient impact resistance. In other words, the ethylene elastomer is preferably limited to be at least one selected from the group consisting of the ethylene propylene elastomer and the ethylene octene elastomer. In the impact-resistant polypropylene film 100, it is through the ethylene elastomer having specific components that the middle layer 2 can provide a sufficient impact resistance.

Method for Producing Impact-Resistant Polypropylene Film

The present disclosure further provides a method for producing an impact-resistant polypropylene film. The above-mentioned impact-resistant polypropylene film 100 can be produced by said method, but the present disclosure is not limited thereto. The method for producing the impact-resistant polypropylene film includes a preparation step and a co-extruding step.

The preparation step is implemented by preparing a propylene block polymer and an ethylene elastomer, the propylene block polymer includes a propylene monomer and an ethylene-propylene polymer, and the ethylene-propylene polymer is dispersed in the propylene monomer to form a sea-island structure. The sea-island structure includes a sea phase and an island phase, the propylene monomer is defined as the sea phase, and the ethylene-propylene polymer is defined as the island phase. Preferably, the ethylene elastomer is at least one selected from the group consisting of an ethylene propylene elastomer and an ethylene octene elastomer.

The co-extruding step is implemented by co-extruding the propylene block polymer and the ethylene elastomer to form an impact-resistant polypropylene, the impact-resistant polypropylene is in a three-layered structure, and the impact-resistant polypropylene includes two outer layers and a middle layer arranged between the two outer layers. After the impact-resistant polypropylene film is placed in an environment having a temperature of 135° C. for 30 minutes, an impact resistance of the impact-resistant polypropylene film is within a range from 80 J/cm to 120 J/cm. More specifically, in the co-extruding step, an extruder is used for a co-extruding process, and a composite layer having the three-layered structure is formed through an extrusion die. An extrusion temperature of each layer is within a range from 220° C. to 260° C., and the film is formed after being cooled down between 20° C. and 50° C.

Each of the outer layers includes the propylene block polymer, and the middle layer includes the propylene block polymer and the ethylene elastomer. Based on 100 parts by weight of the middle layer, a content of the propylene block polymer is 60 to 80 parts by weight, and a content of the ethylene elastomer is 20 to 40 parts by weight.

In each of the outer layers, a melt index (MI) of the propylene block polymer is within a range from 0.5 to 5. In the middle layer, a melt index (MI) of the propylene block polymer is within a range from 0.5 to 5, and a melt index (MI) of the ethylene elastomer is within a range from 0.5 to 5.

In each of the outer layers, based on 100 parts by weight of the propylene block polymer, a content of the propylene monomer is 78 to 83 parts by weight, and a content of the ethylene-propylene polymer is 17 to 22 parts by weight.

In the middle layer, the propylene block polymer includes a propylene monomer and an ethylene-propylene polymer, and the ethylene-propylene polymer is dispersed in the propylene monomer to form a sea-island structure. The sea-island structure includes a sea phase and an island phase, the propylene monomer is defined as the sea phase, and the ethylene-propylene polymer is defined as the island phase. In the middle layer, based on 100 parts by weight of the propylene block polymer, a content of the propylene monomer is 78 to 83 parts by weight, and a content of the ethylene-propylene polymer is 17 to 22 parts by weight.

Experimental Results

Hereinafter, a more detailed description will be provided with reference to Exemplary Examples 1 to 5 and Comparative Examples 1 to 3. However, the following Exemplary Examples are only used to aid in understanding of the present disclosure, and are not to be construed as limiting the scope of the present disclosure.

In Exemplary Example 1, each of the outer layers includes 100 parts by weight of the propylene block polymer, the outer layers account for 30% of a total thickness, the middle layer includes 80 parts by weight of the propylene block polymer and 20 parts by weight of the ethylene elastomer, the middle layer accounts for 70% of the total thickness, and a film having a thickness of 70 micrometers is formed by three-layered co-extrusion.

In Exemplary Example 2, each of the outer layers includes 100 parts by weight of the propylene block polymer, the outer layers account for 30% of a total thickness, the middle layer includes 70 parts by weight of the propylene block polymer and 30 parts by weight of the ethylene elastomer, the middle layer accounts for 70% of the total thickness, and a film having a thickness of 70 micrometers is formed by three-layered co-extrusion.

In Exemplary Example 3, each of the outer layers includes 100 parts by weight of the propylene block polymer, the outer layers account for 30% of a total thickness, the middle layer includes 60 parts by weight of the propylene block polymer and 40 parts by weight of the ethylene elastomer, the middle layer accounts for 70% of the total thickness, and a film having a thickness of 70 micrometers is formed by three-layered co-extrusion.

In Exemplary Example 4, each of the outer layers includes 100 parts by weight of the propylene block polymer, the outer layers account for 30% of a total thickness, the middle layer includes 70 parts by weight of the propylene block polymer and 30 parts by weight of the ethylene elastomer, the middle layer accounts for 70% of the total thickness, and a film having a thickness of 60 micrometers is formed by three-layered co-extrusion.

In Exemplary Example 5, each of the outer layers includes 100 parts by weight of the propylene block polymer, the outer layers account for 30% of a total thickness, the middle layer includes 70 parts by weight of the propylene block polymer and 30 parts by weight of the ethylene elastomer, the middle layer accounts for 70% of the total thickness, and a film having a thickness of 100 micrometers is formed by three-layered co-extrusion.

In Comparative Example 1, each of the outer layers includes 100 parts by weight of a propylene homopolymer, the outer layers account for 30% of a total thickness, the middle layer includes 70 parts by weight of the propylene block polymer and 30 parts by weight of the ethylene elastomer, the middle layer accounts for 70% of the total thickness, and a film having a thickness of 100 micrometers is formed by three-layered co-extrusion.

In Comparative Example 2, each of the outer layers includes 50 parts by weight of the propylene homopolymer and 50 parts by weight of the propylene block polymer, the outer layers account for 30% of a total thickness, the middle layer includes 70 parts by weight of the propylene block polymer and 30 parts by weight of the ethylene elastomer, the middle layer accounts for 70% of the total thickness, and a film having a thickness of 70 micrometers is formed by three-layered co-extrusion.

In Comparative Example 3, each of the outer layers includes 100 parts by weight of the propylene block polymer, the outer layers account for 30% of a total thickness, the middle layer includes 100 parts by weight of the propylene block polymer, the middle layer accounts for 70% of the total thickness, and a film having a thickness of 70 micrometers is formed by three-layered co-extrusion.

For the impact-resistant polypropylene film 100 of each of Exemplary Examples 1 to 5 and Comparative Examples 1 to 3, components, a melt index (MI), a heat seal strength, and an impact resistance thereof are listed in Table 1 below, and relevant testing methods are described as follows.

A melt index (MI) test is carried out according to ASTM D1238.

A heat seal strength test includes: heat-sealing two film surfaces at a temperature of 200° C. and a pressure of 0.2 MPa for 1 second, and testing the heat seal strength at a speed of 300 mm/min.

An impact resistance test includes: using an impact head (size: ½ inches) with a load of 1.5 J and at −5° C. to perform testing, and taking an average value of five test results.

TABLE 1

[Components of Exemplary Examples and Comparative Examples and Test Results of Their Physical and Chemical Properties]

| | Item | Exemplary Example 1 | Exemplary Example 2 | Exemplary Example 3 | Exemplary Example 4 | Exemplary Example 5 |
|---|---|---|---|---|---|---|
| Parameter of each component | thickness of the impact-resistant polypropylene film (micrometer) | 70 | 70 | 70 | 60 | 100 |
| | thickness of the outer layers (micrometer) | 21 | 21 | 21 | 18 | 30 |
| | thickness of the middle layer (micrometer) | 49 | 49 | 49 | 42 | 70 |
| | content of the propylene block polymer in each of the outer layers (parts by weight) | 100 | 100 | 100 | 100 | 100 |
| | content of the propylene homopolymer in each of the outer layers (parts by weight) | — | — | — | — | — |
| | content of the propylene block polymer in the middle layer (parts by weight) | 70 | 80 | 60 | 70 | 70 |
| | content of the ethylene elastomer in the middle layer (parts by weight) | 30 | 20 | 40 | 30 | 30 |
| | melt index (MI) of the propylene random copolymer in the middle layer | 2 | 2 | 2 | 2 | 2 |
| | melt index (MI) of the ethylene elastomer copolymer in the middle layer | 2 | 2 | 2 | 2 | 2 |
| Physical properties | impact resistance of the impact-resistant polypropylene film after placement in the environment having the temperature of 135° C. for 30 minutes (J/cm) | 101 | 85 | 119 | 80 | 120 |
| | heat seal strength of the impact-resistant polypropylene film (N/15 mm) | 65 | 70 | 60 | 55 | 79 |

| | Item | Comparative Example 1 | Comparative Example 2 | Comparative Example 3 |
|---|---|---|---|---|
| Parameter of each component | thickness of the impact-resistant polypropylene film (micrometer) | 70 | 70 | 70 |
| | thickness of the outer layers (micrometer) | 21 | 21 | 21 |
| | thickness of the middle layer (micrometer) | 49 | 49 | 49 |

-continued

| | Item | Comparative Example 1 | Comparative Example 2 | Comparative Example 3 |
|---|---|---|---|---|
| | content of the propylene block polymer in each of the outer layers (parts by weight) | — | 50 | 100 |
| | content of the propylene homopolymer in each of the outer layers (parts by weight) | 100 | 50 | — |
| | content of the propylene block polymer in the middle layer (parts by weight) | 70 | 70 | 100 |
| | content of the ethylene elastomer in the middle layer (parts by weight) | 30 | 30 | — |
| | melt index (MI) of the propylene random copolymer in the middle layer | 2 | 2 | 2 |
| | melt index (MI) of the ethylene elastomer copolymer in the middle layer | 2 | 2 | — |
| Physical properties | impact resistance of the impact-resistant polypropylene film after placement in the environment having the temperature of 135° C. for 30 minutes (J/cm) | 68 | 71 | 75 |
| | heat seal strength of the impact-resistant polypropylene film (N/15 mm) | 80 | 72 | 66 |

Discussion of Test Results

A comparison is made between Exemplary Example 1 and Comparative Examples 1 and 2. When each of the outer layers does not include 100 parts by weight of the propylene block polymer, the heat seal strength may be good, but the impact resistance of the film is too low (i.e., lower than 80 J/cm).

A comparison is made between Exemplary Example 1 and Comparative Example 3. Without the ethylene elastomer being added in the middle layer, the film has a poor impact resistance. As shown in Exemplary Examples 1 to 3, the content of the ethylene elastomer is 20 to 40 parts by weight, such that the film can have both an excellent impact resistance and an excellent heat seal strength. As shown in Exemplary Examples 1, 4, and 5, when the thickness increases, the impact resistance and the heat seal strength are significantly enhanced.

Beneficial Effects of the Embodiment

In conclusion, in the impact-resistant polypropylene film and the method for producing the same provided by the present disclosure, by virtue of "each of the two outer layers including a propylene block polymer, the propylene block polymer including a propylene monomer and an ethylene-propylene polymer, and the ethylene-propylene polymer being dispersed in the propylene monomer to form a sea-island structure," "the middle layer including a propylene block polymer and an ethylene elastomer," and "based on 100 parts by weight of the middle layer, a content of the propylene block polymer being 60 to 80 parts by weight, and a content of the ethylene elastomer being 20 to 40 parts by weight," the issue of the conventional polypropylene film not having a sufficient impact resistance can be effectively improved.

The foregoing description of the exemplary embodiments of the disclosure has been presented only for the purposes of illustration and description and is not intended to be exhaustive or to limit the disclosure to the precise forms disclosed. Many modifications and variations are possible in light of the above teaching.

The embodiments were chosen and described in order to explain the principles of the disclosure and their practical application so as to enable others skilled in the art to utilize the disclosure and various embodiments and with various modifications as are suited to the particular use contemplated. Alternative embodiments will become apparent to those skilled in the art to which the present disclosure pertains without departing from its spirit and scope.

What is claimed is:

1. An impact-resistant polypropylene film, characterized in that the impact-resistant polypropylene film has a three-layered structure, the impact-resistant polypropylene film comprising:
two outer layers each including a propylene block polymer, wherein the propylene block polymer includes a propylene monomer and an ethylene-propylene polymer, and the ethylene-propylene polymer is dispersed in the propylene monomer to form a sea-island structure; wherein the sea-island structure includes a sea phase and an island phase, the propylene monomer is defined as the sea phase, and the ethylene-propylene polymer is defined as the island phase; and a middle layer arranged between the two outer layers and including a propylene block polymer and an ethylene elastomer, wherein, based on 100 parts by weight of the middle layer, a content of the propylene block polymer is 60 to 80 parts by weight, and a content of the ethylene elastomer is 20 to 40 parts by weight;

wherein, after the impact-resistant polypropylene film is placed in an environment having a temperature of 135° C. for 30 minutes, an impact resistance of the impact-resistant polypropylene film is within a range from 80 J/cm to 120 J/cm.

2. The impact-resistant polypropylene film according to claim 1, wherein, in each of the outer layers, a melt index (MI) of the propylene block polymer is within a range from 0.5 to 5.

3. The impact-resistant polypropylene film according to claim 1, wherein, in each of the outer layers, based on 100 parts by weight of the propylene block polymer, a content of the propylene monomer is 78 to 83 parts by weight, and a content of the ethylene-propylene polymer is 17 to 22 parts by weight.

4. The impact-resistant polypropylene film according to claim 1, wherein, in the middle layer, a melt index (MI) of the propylene block polymer is within a range from 0.5 to 5, and a melt index (MI) of the ethylene elastomer is within a range from 0.5 to 5.

5. The impact-resistant polypropylene film according to claim 1, wherein the ethylene elastomer is at least one selected from the group consisting of an ethylene propylene elastomer and an ethylene octene elastomer.

6. The impact-resistant polypropylene film according to claim 1, wherein, in the middle layer, the propylene block polymer includes a propylene monomer and an ethylene-propylene polymer, and the ethylene-propylene polymer is dispersed in the propylene monomer to form a sea-island structure; wherein the sea-island structure includes a sea phase and an island phase, the propylene monomer is defined as the sea phase, and the ethylene-propylene polymer is defined as the island phase.

7. The impact-resistant polypropylene film according to claim 6, wherein, in the middle layer, based on 100 parts by weight of the propylene block polymer, a content of the propylene monomer is 78 to 83 parts by weight, and a content of the ethylene-propylene polymer is 17 to 22 parts by weight.

8. The impact-resistant polypropylene film according to claim 1, wherein a thickness of each of the outer layers is 20% to 40% of a thickness of the impact-resistant polypropylene film, and a thickness of the middle layer is 60% to 80% of the thickness of the impact-resistant polypropylene film.

9. The impact-resistant polypropylene film according to claim 1, wherein a heat seal strength of the impact-resistant polypropylene film is within a range from 55 N/15 mm to 79 N/15 mm.

10. The impact-resistant polypropylene film according to claim 1, wherein each of the outer layers does not include other components except the propylene block polymer.

11. A method for producing an impact-resistant polypropylene film, comprising:

a preparation step implemented by preparing a propylene block polymer and an ethylene elastomer, wherein the propylene block polymer includes a propylene monomer and an ethylene-propylene polymer, and the ethylene-propylene polymer is dispersed in the propylene monomer to form a sea-island structure; wherein the sea-island structure includes a sea phase and an island phase, the propylene monomer is defined as the sea phase, and the ethylene-propylene polymer is defined as the island phase; and a co-extruding step implemented by co-extruding the propylene block polymer and the ethylene elastomer to form the impact-resistant polypropylene film, wherein the impact-resistant polypropylene film has a three-layered structure, and the impact-resistant polypropylene film includes two outer layers and a middle layer arranged between the two outer layers; wherein each of the outer layers includes the propylene block polymer, and the middle layer includes the propylene block polymer and the ethylene elastomer; wherein, based on 100 parts by weight of the middle layer, a content of the propylene block polymer is 60 to 80 parts by weight, and a content of the ethylene elastomer is 20 to 40 parts by weight;

wherein, after the impact-resistant polypropylene film is placed in an environment having a temperature of 135° C. for 30 minutes, an impact resistance of the impact-resistant polypropylene film is within a range from 80 J/cm to 120 J/cm.

12. The method according to claim 11, wherein, in each of the outer layers, a melt index (MI) of the propylene block polymer is within a range from 0.5 to 5; wherein, in the middle layer, a melt index (MI) of the propylene block polymer is within a range from 0.5 to 5, and a melt index (MI) of the ethylene elastomer is within a range from 0.5 to 5.

13. The method according to claim 11, wherein, in each of the outer layers, based on 100 parts by weight of the propylene block polymer, a content of the propylene monomer is 78 to 83 parts by weight, and a content of the ethylene-propylene polymer is 17 to 22 parts by weight.

14. The method according to claim 11, wherein the ethylene elastomer is at least one selected from the group consisting of an ethylene propylene elastomer and an ethylene octene elastomer.

15. The method according to claim 11, wherein, in the middle layer, the propylene block polymer includes a propylene monomer and an ethylene-propylene polymer, and the ethylene-propylene polymer is dispersed in the propylene monomer to form a sea-island structure; wherein the sea-island structure includes a sea phase and an island phase, the propylene monomer is defined as the sea phase, and the ethylene-propylene polymer is defined as the island phase; wherein, in the middle layer, based on 100 parts by weight of the propylene block polymer, a content of the propylene monomer is 78 to 83 parts by weight, and a content of the ethylene-propylene polymer is 17 to 22 parts by weight.

\* \* \* \* \*